United States Patent [19]
Sato et al.

[11] Patent Number: 5,695,427
[45] Date of Patent: Dec. 9, 1997

[54] AUTOMATIC TRANSMISSION CONTROL SYSTEM

[75] Inventors: Kazuhiko Sato, Hitachioota; Masahiko Ibamoto, Hitachinaka; Hiroshi Kuroiwa, Hitachi, all of Japan

[73] Assignees: Hitachi, Ltd.; Hitachi Automotive Engineering Co., Ltd., both of Japan

[21] Appl. No.: 653,801

[22] Filed: Jul. 19, 1996

Related U.S. Application Data

[62] Division of Ser. No. 359,615, Dec. 20, 1994, abandoned.

[30] Foreign Application Priority Data

Dec. 20, 1993 [JP] Japan .................................. 5-319374

[51] Int. Cl.$^6$ .................................................. B60K 41/12
[52] U.S. Cl. ...................... 477/43; 477/46; 477/48
[58] Field of Search .................. 477/43–48, 110, 477/111

[56] References Cited

U.S. PATENT DOCUMENTS

| | | | |
|---|---|---|---|
| 4,686,871 | 8/1987 | Kobayashi | 477/43 X |
| 4,699,025 | 10/1987 | Omitsu | 477/47 |
| 4,720,793 | 1/1988 | Watanabe et al. | 477/43 X |
| 4,735,114 | 4/1988 | Satoh et al. | 477/43 |
| 4,893,526 | 1/1990 | Tokoro | 477/43 X |
| 4,922,424 | 5/1990 | Hiramatsu | 477/46 |
| 4,942,783 | 7/1990 | Morimoto | 477/48 |
| 4,945,483 | 7/1990 | Tokoro | 477/48 X |
| 5,413,540 | 5/1995 | Streib et al. | 477/43 |
| 5,545,106 | 8/1996 | Senger et al. | 477/43 |

FOREIGN PATENT DOCUMENTS

| | | |
|---|---|---|
| 36 28 490 A1 | 4/1987 | Germany . |
| 38 12 673 A1 | 11/1988 | Germany . |
| 363222943 | 9/1988 | Japan .................. 477/43 |
| 94005934 | 3/1994 | WIPO .................. 477/46 |
| 3094024465 | 10/1994 | WIPO .................. 477/46 |

OTHER PUBLICATIONS

Abstract of Japan for Japanese Laid–Open Sho 62–4645 dated Jan. 10, 1987.
Abstract of Japan for Japanese Laid–Open Sho 62–199534 dated Sep. 3, 1987.
Abstract of Japan for Japanese Laid–Open Hei 3–20164 dated Jan. 29, 1991.
Abstract of Japan for Japanese Laid–Open Hei 4–8964 dated Jan. 13, 1992.
Abstract of Japan for Japanese Laid–Open Hei 4–100740 dated Apr. 2, 1992.
Mechanisms And Characteristics of CVT For the Vehicle, Tetsuji Yada, pp. 122–132.
Future Problems on CVT and Automatic Transmission, Tetsuji Yada, pp. 1–6.
CVT, Motoyasu Miyawaki, pp. 96–99.

(List continued on next page.)

*Primary Examiner*—Khoi Q. Ta
*Attorney, Agent, or Firm*—Evenson, McKeown, Edwards & Lenahan, P.L.L.C.

[57] ABSTRACT

A speed change controlling apparatus and method for a non-stage change-gear system of the V-belt type or CVT are disclosed, wherein control is performed based particularly on the torque of a non-stage change-gear to meet with a high degree of accuracy requirements in which importance is attached to the fuel cost of a vehicle or the power performance and the time for development of a speed change schedule is avoided. A torque of a change-gear is estimated and speed change control is performed based on a targeted drive shaft torque so that the necessity for a speed change schedule map is eliminated and accurate speed change control based on the torque is performed. Consequently, an object speed change characteristic can be produced readily with a high degree of accuracy. Because matching need not be performed for each vehicle, the development man-hours can be reduced remarkably.

2 Claims, 6 Drawing Sheets

OTHER PUBLICATIONS

An Electric Control Concept for a Continuously Variable Transmission, G. Abromait et al., 4 pages.

Field Experience and Further Developments of Control Systems for CVTs in Passenger Cars, Werner Kalkert and Ulrich Eggert, pp. 1.495–1.512.

Control Strategies for a Chain Drive CVT, U. Eggert and H. D. Schneider, ImechE/SAE 1984, pp. 219–226.

Control and Response of Continuously Variable Transmission (CVT) Vehicles; Di Yang, Z. Guo and A. A. Frank, University of Wisconsin, Madison, WI, pp. 1438–1444.

Continuously Variable Transmission Control, John M. Ironside and P. W. R. Stubbs, B. L. Technology Limited, 1980 Vehicular Technology Society IEEE, pp. 1–8.

AUTOMATIC TRANSMISSION CONTROL SYSTEM

BACKGROUND AND SUMMARY OF THE INVENTION

This is a divisional of application Ser. No. 08/359,615, filed Dec. 20, 1994 now abandoned.

The present invention relates to an automatic transmission control system for a vehicle, and more particularly, to an automatic transmission control system which employs a non-stage change-gear system of the V-belt type, also known as a continuously variable transmission (CVT).

A known speed change controlling method for an automatic transmission with a non-stage change-gear system of the V-belt type is disclosed in the Official Gazette of Japanese Patent Laid-Open Application No. Hei 4-321873. The automatic transmission with a non-stage change-gear system control normally calculates a targeted input pulley speed from an engine load condition detection signal of a throttle sensor or the like and a vehicle velocity signal, and operates a change-gear by way of an actuator so that the change-gear ratio corresponding to the targeted value may be obtained.

In order to calculate the targeted input pulley speed, it has been a common practice to make that calculation using a change-gear schedule map held in a memory of an electronic control apparatus, but it may be calculated individually. It is also a common practice to change the change-gear schedule map when the range position as represented by a travel pattern such as a normal range or a sporty range. When the range position is the normal range, however, the speed change must be performed using a schedule map determined in advance for the normal range, but when the range position is the sporty range, the speed change must be performed using another schedule map determined similarly in advance.

Any of the schedule maps described above indicates a speed change schedule set unitarily from all-round phases such as a fuel cost characteristic, an acceleration characteristic and so forth by a vehicle maker or a transmission maker, and when it is desired to modify the speed change schedule., for example, for a countermeasure against a displacement of the change-gear control amount arising from an aging of mechanical components or in accordance with the taste of an individual user of a vehicle or the operation condition, that is, an acceleration characteristic or an engine brake characteristic, the prior art method does not take these various conditions into consideration.

Further, much time is required to develop the speed change schedule maps, and that time is so great that any reduction of the time results in a considerable reduction of the total development time.

The Official Gazette of Japanese Patent Laid-Open Application No. Hei 3-163256 refers to a technique for controlling an automatic transmission control system without speed change schedule maps. In particular, a targeted output torque is calculated using a membership-function and a fuzzy rule. Then an engine torque is controlled and an actual output torque is controlled to approximate closely the targeted output torque. However, this technique does not detect an input shaft rotational speed, does not estimate an input torque, and does not calculate a change-gear ratio of the non-stage change-gear system of the V-belt type or CVT.

Accordingly, an object of the present invention is to provide an automatic transmission which can achieve reduction of the matching man-hours for a speed change schedule map, thereby reducing total development time, and to achieve fine speed change control in accordance with a vehicle condition by providing vehicle characteristics such as an engine characteristic or a torque converter characteristic and so forth to the automatic transmission.

In order to attain the object described above, an engine torque is estimated from vehicle parameters, that is, an engine speed and a parameter indicating a load to the engine such as an accelerator opening to calculate a change-gear input torque, and a ratio between the thus estimated change-gear input torque and a targeted drive shaft torque which is based on the parameter indicating engine load, is then calculated to determine a targeted change-gear ratio. Thereafter, the change-gear ratio is controlled using the targeted change-gear ratio.

With the control method of the present invention described above, it is possible to effect speed change conforming to a condition of the vehicle without using a speed change schedule map for the change-gear, and the substantial amount of time required for tuning of speed change schedule maps, is reduced remarkably.

Further, by performing speed change control in accordance with the drive shaft torque, setting of a travel mode in which importance is attached to the fuel cost, another travel mode in which importance is attached to power performance or the like can be performed simply.

P DETAILED DESCRIPTION OF THE DRAWINGS

Figure 1:
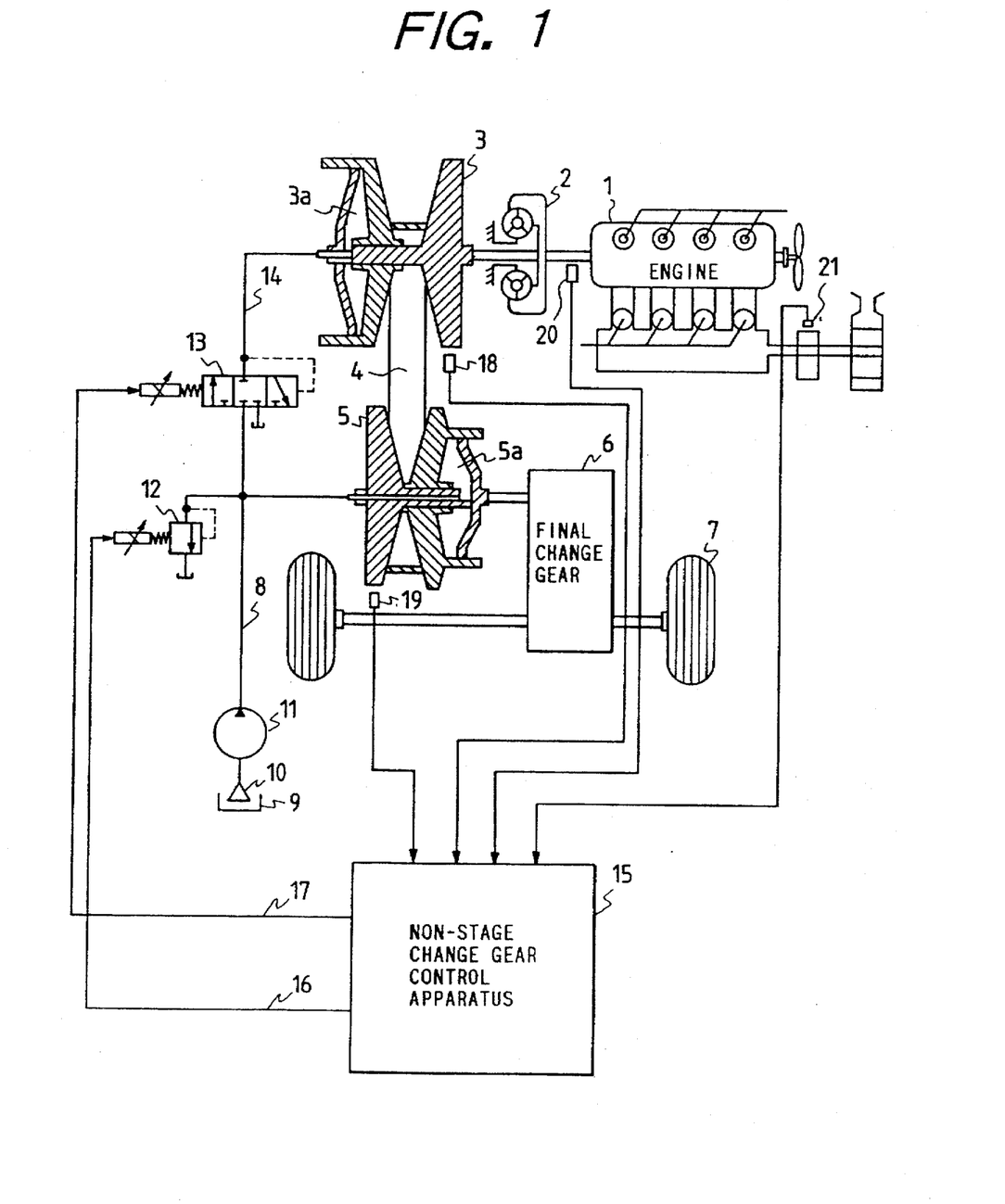
FIG. 1 is a view of an overall construction of a CVT with a control system in accordance with one embodiment of the present invention.

With specific reference to FIG. 1, torque generated from an engine 1 is inputted to a driving pulley 3 of a non-stage change-gear system of the V-belt type (or CVT) by way of a directly coupleable torque converter 2 (this will be referred to as a locking up function). The torque converter is of conventional construction and has a pump and a turbine. The torque inputted to the driving pulley 3 is transmitted to a driven pulley 5 by way of a V-belt 4.

The driving pulley 3 and the driven pulley 5 are each constructed such that one member thereof, or pulley half, is fixed while the other member, or other pulley half, changes its position in a direction parallel to an axis of rotation thereof by hydraulic action. Consequently, the gap distance between the pulley members is changed, and the travel diameter of the V-belt 4 is changed to effect an infinitely variable speed changing operation. The torque undergoing the speed changing operation and transmitted to the driven pulley 5 is transmitted first to a final change-gear 6 and finally to driving wheels 7.

Meanwhile, describing routes of the hydraulic system, oil is sucked from an oil reservoir 9 through an oil filter 10 by a pump 11 and is discharged into an oil passage 8. The hydraulic pressure of the oil passage 8 is generally referred to as line pressure and is adjusted by a line pressure control valve 12 so that it acts as a basic pressure for a speed changing operation.

The line pressure control valve 12 is an electromagnetic proportional control valve which receives from an electric line or route 16 an indication pressure calculated in a non-stage change-gear control apparatus 15 having a built-in microcomputer, and performs electromagnetic to hydraulic conversion to control the line pressure.

The line pressure is introduced into a driven pulley cylinder oil chamber 5a by way of the oil passage 8, and is also introduced into a-driving pulley cylinder oil chamber 3a, via a speed change control valve or actuator 13, by way of an oil passage 14.

The speed change control valve 13 is also an electromagnetic proportional control valve which receives, similarly to the line pressure control valve 12, a signal from the non-stage change gear control apparatus 15 by way of an electric line or route 17 and performs electromagnetic to hydraulic conversion to control the hydraulic pressure of the oil passage 14.

It is to be noted here that the signal flowing in the electric line 17 indicates an absolute value of the hydraulic pressure of the oil passage 14 but does not indicate a ratio of the hydraulic pressure of the oil passage 14 to the line pressure (hydraulic pressure of the oil passage 8). Further, even if the calculated indication pressure value from the apparatus is higher than the line pressure, the upper limit to the pressure of the driving pulley cylinder oil chamber 3a is limited by the line pressure. Consequently, the hydraulic pressure of the oil passage 14 is never higher than the line pressure.

The pressure receiving area of the driving pulley cylinder oil chamber 3a in its axial direction is sized to almost twice that of the driven pulley cylinder oil chamber 5a. Consequently, the belt pressing pressure of the driving pulley 3 can be controlled to a range exceeding the pressing pressure of the driven pulley 5, and an arbitrary pressing pressure ratio (ratio between the driving pulley pressing pressure and the driven pulley pressing pressure) can be realized. Accordingly, operation can be performed from a high change-gear ratio (with lower line pressure) to a low change-gear ratio (with higher line pressure) only by the line pressure control valve 12 and the speed change control valve 13.

The driving pulley speed sensor 18 transmits rotational speed of the driving pulley 3 as an electric signal (a speed data of the driving pulley, Npri) to the non-stage change-gear control apparatus 15. Alteratively, an engine speed sensor 20 may transmit a signal to the apparatus 15 if direct-coupling/non-direct-coupling data of the torque converter 2 and the speed ratio between a pump of the torque converter and a turbine thereof are identified.

Meanwhile, the driven pulley speed sensor 19 also transmits rotational speed of the driven pulley 5 as an electric signal to the non-stage change-gear control apparatus 15. It is to be noted that the driven pulley speed sensor 19 need not detect the rotational speed of the driven pulley 5 directly but may detect the rotational speed of the vehicle drive shaft and the final change-gear 6 (that is the velocity of the vehicle, also expressed as vehicle velocity data, Vsp). Of course, it is better way that a real velocity of the vehicle is detected directly, so that a characteristic difference in the final change-gear 6 or of the drive shaft need not be taken into consideration. The non-stage change-gear control apparatus 15 can calculate an actual change-gear ratio by taking the ratio between the rotational speeds of the driving pulley 3 and of the driven pulley 5.

The engine speed sensor 20 and a throttle opening sensor 21 provide signals required when an engine torque is to be estimated. The engine speed sensor 20 may employ a crank angle signal or an ignition timing signal of an engine control apparatus. Meanwhile, the throttle sensor 21 may be a sensor which detects an intake pipe negative pressure of the engine or a mass air flow rate.

Figure 2:
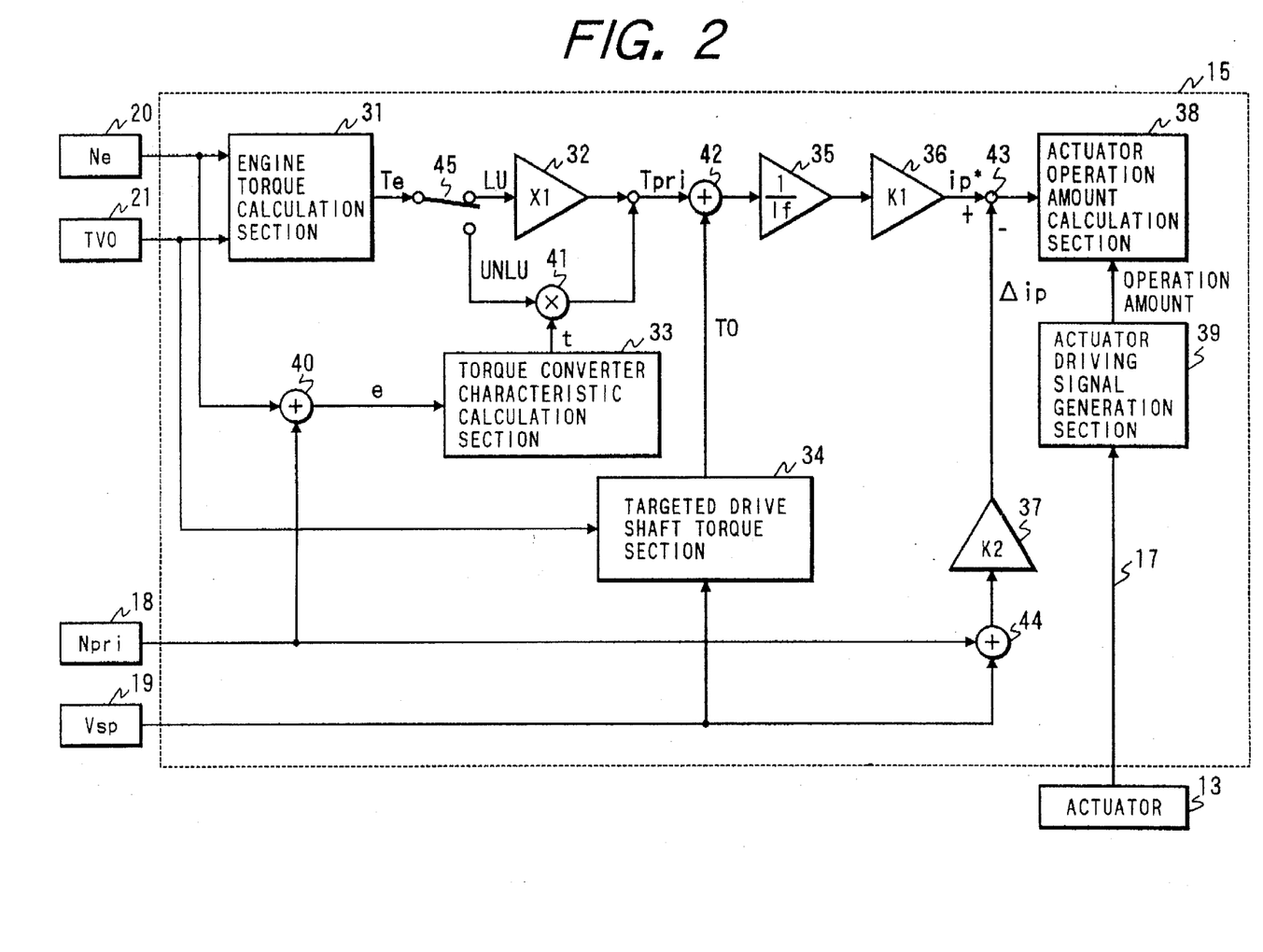
FIG. 2 is a detailed view of the control system of FIG. 1.
Figure 3:
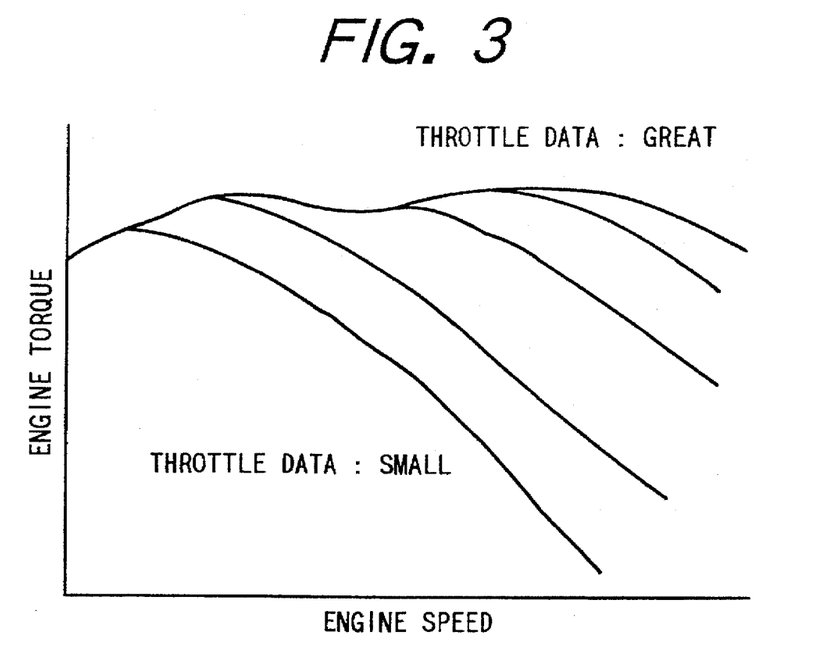
FIG. 3 is a graph illustrating an example of an engine characteristic, namely throttle valve opening in relation to engine speed and engine torque.

With regard to the block diagram of FIG. 2 illustrating a controlling method inside of the non-stage change-gear control apparatus 15, engine speed data, Ne, from the engine speed sensor 20 and a throttle opening data, TVO, from the throttle sensor 21 are supplied to an engine torque calculation section 31. The engine torque calculation section 31 has stored in a memory a vehicle engine characteristic shown in FIG. 3 and can estimate a current vehicle engine torque, Te, along the ordinate by taking the engine speed along the abscissa and taking the throttle opening data as a parameter.

Figure 4:
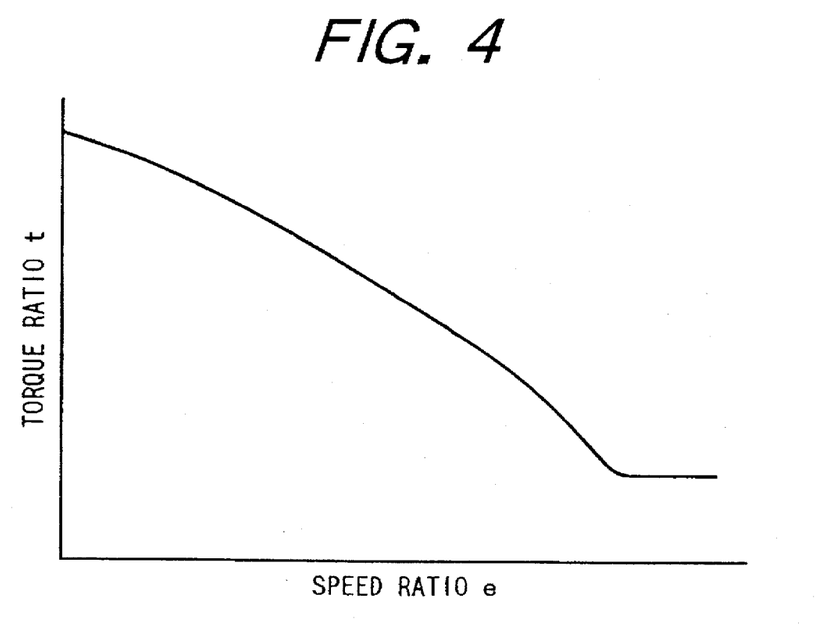
FIG. 4 is a graph illustrating an example of a torque converter characteristic.

Subsequently, the current engine torque, Te, thus calculated is multiplied by a constant 1 at a section 32 if locking-up of the torque converter is performed at a section 45. If locking-up is not being performed, then the torque ratio, t, calculated by a torque converter characteristic calculation section 33 is multiplied by the current engine torque, Te, at a section 41 to calculate a change-gear input torque, Tpri. The torque converter characteristic calculation section 33 divides the data, Ne, from the engine speed sensor 20 and the data, Npri, from the driving pulley speed sensor 18 at a section 40 to calculate a speed ratio, e, which is a ratio between the input side rotational speed and the output side rotational speed of the torque converter 2 and calculates a torque ratio, t, from the torque converter characteristic of FIG. 4 stored in advance in memory.

Figure 5:
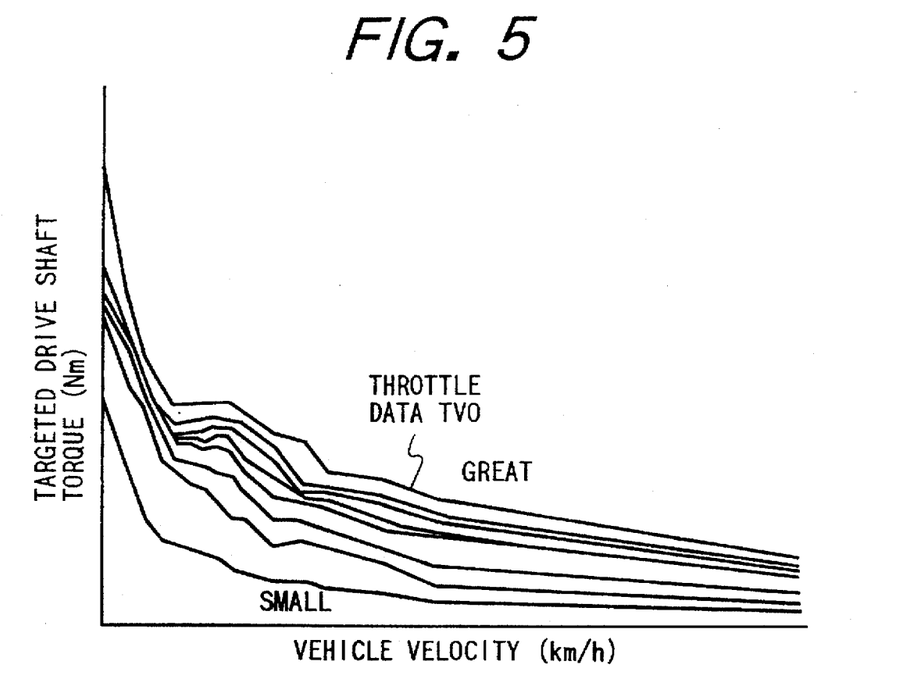
FIG. 5 is a graph showing an example of a targeted drive shaft torque characteristic with respect to vehicle velocity and driving torque.

Then, using a targeted drive shaft torque, TO, characteristic shown in FIG. 5 stored in memory in a targeted driving torque section 34 with the throttle opening data taken as the parameter, the vehicle velocity data, Vsp, from the driven pulley speed sensor 19 and the throttle opening data, TVO, from the throttle sensor 21 are inputted to the section 34 to calculate the targeted drive shaft torque, TO. The estimated change-gear input torque, Tpri, calculated previously and the targeted drive shaft torque, TO, calculated by the section 34 are divided at a section 42, then divided by the final change-gear ratio, If, at a section 35 and then multiplied by a constant, K1, at a section 36 to obtain a targeted change-gear ratio, ip*, that is, a change-gear ratio instruction value for the change-gear.

As a result, the targeted drive shaft torque, TO, as illustrated in FIG. 5, approximates an ideal driving torque with respect to the vehicle velocity, which allows speed change control which attaches importance to pursuit of a power performance of the vehicle.

In the illustrated embodiment of the present invention as seen in FIGS. 1 through 5, control which employs a single targeted drive shaft torque map is described for simplification. Normally, however, maps should be set so that a map is changed over depending upon the difference in application such as the economy mode where importance is attached to the fuel cost or the power mode where importance is attached to the power performance. Further, the difference in driving mode may be automatically changed over, for example, in response to the magnitude of the variation of the throttle opening data.

A present actual change-gear ratio, Δip, can be obtained by dividing the data, Npri, from the driving pulley speed sensor 18 and the vehicle velocity data, Vsp, from the driven pulley speed sensor 19 at a section 44 and multiplying the output by a constant, K2, at a section 37. Then a deviation from the targeted speed change can be calculated by taking the difference between the targeted change-gear ratio, ip*, calculated previously and the actual change-gear ratio, Δip. An actuator operation amount is calculated from the thus calculated deviation by an actuator operation amount calculation section 38, and the actuator operation amount is converted by an actuator driving signal generation section 39 into a signal to drive the actuator 13.

Figure 6:
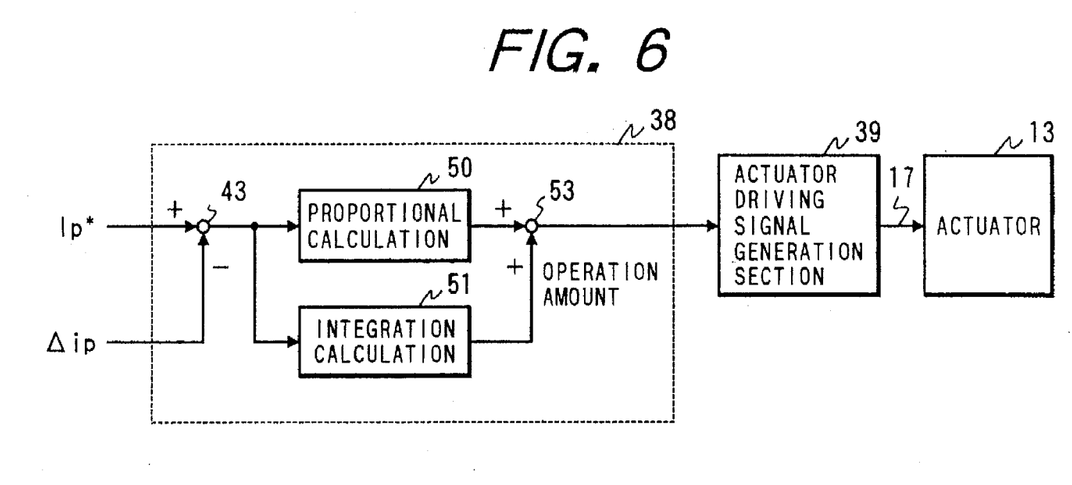
FIG. 6 is a schematic diagram of a control system for change speed control of another embodiment of the proportional integration type.

Now, the actuator operation amount calculation section 38 can calculate an operation amount of the actuator 13 by executing via, for example, a proportional calculation section 50 and an integration calculation section 51 for the preceding actual change-gear ratio, Δip, deviation as shown in FIG. 6 and then summing at section 53.

Figure 9:
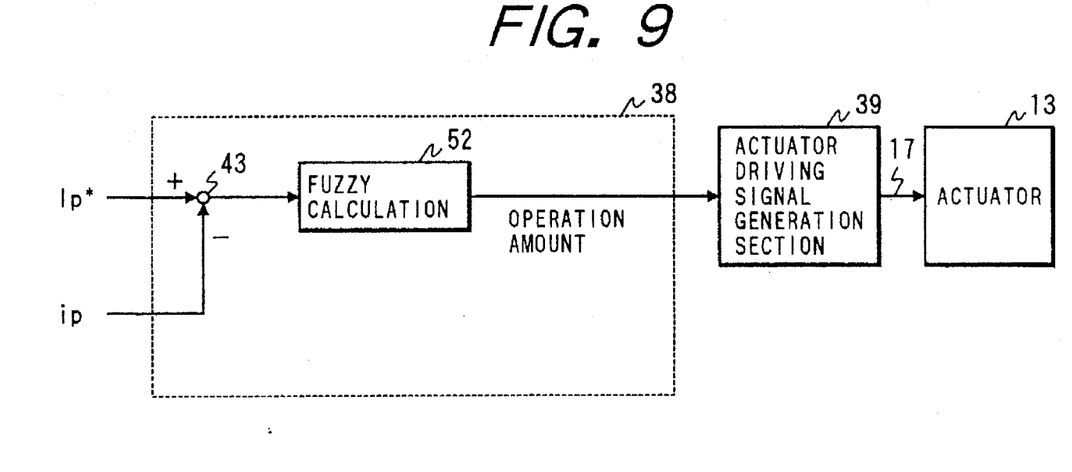
FIG. 9 is a schematic diagram of a control system for change gear ratio control of the fuzzy type in accordance with still another embodiment of the present invention.

In another embodiment shown in FIG. 9, the actuator operation amount can be calculated by fuzzy inference in a section 52 based on the deviation in lieu of the proportional and integration calculations in a section 50 and a section 51 of FIG. 6.

Figure 7:
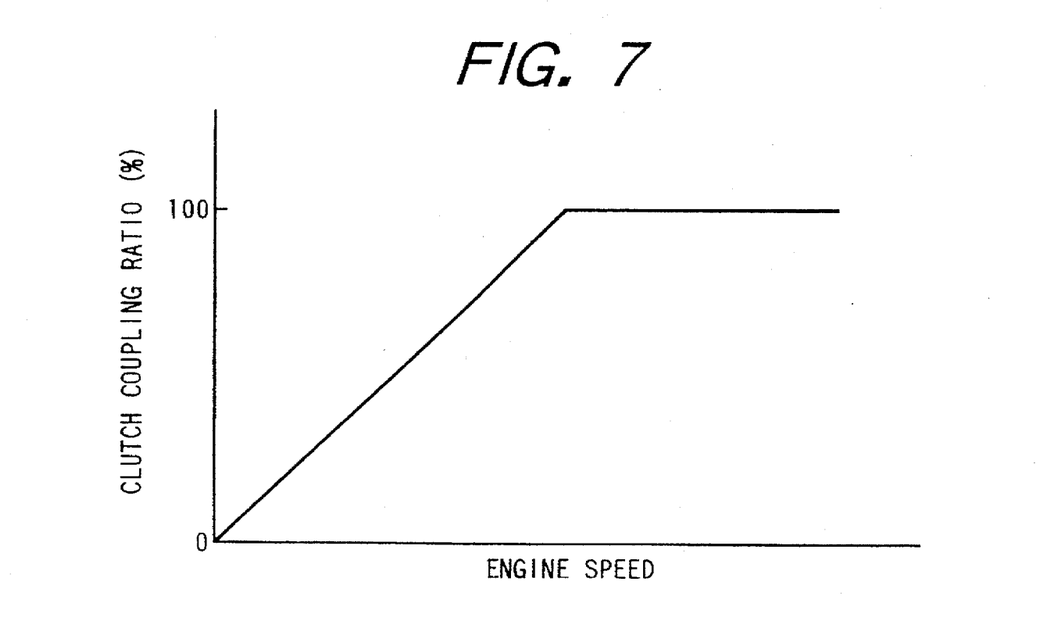
FIG. 7 is a graph showing an example of an electromagnetic clutch characteristic, namely clutch coupling ratio in relation to engine speed.

An electromagnetic clutch characteristic diagram is shown in FIG. 7 in an embodiment where an electromagnetic clutch is employed in lieu of the torque converter 2. The controlling method for the electromagnetic clutch generally involves raising the excitation current to raise the transmission torque as the engine speed increases as shown in FIG. 7. Because the electromagnetic clutch does not have a torque doubling force as does a torque converter, the torque transmitted in a completely coupled condition has a ratio to the input torque substantially equal to 1 to the input torque. Consequently, the result, t, of the section 33 in the block diagram of FIG. 2 is less than 1, i.e. t<1, and there is some disadvantage with respect to torque when locking up is not being performed, such as upon starting, as compared with the case where a torque converter is used.

Figure 8:
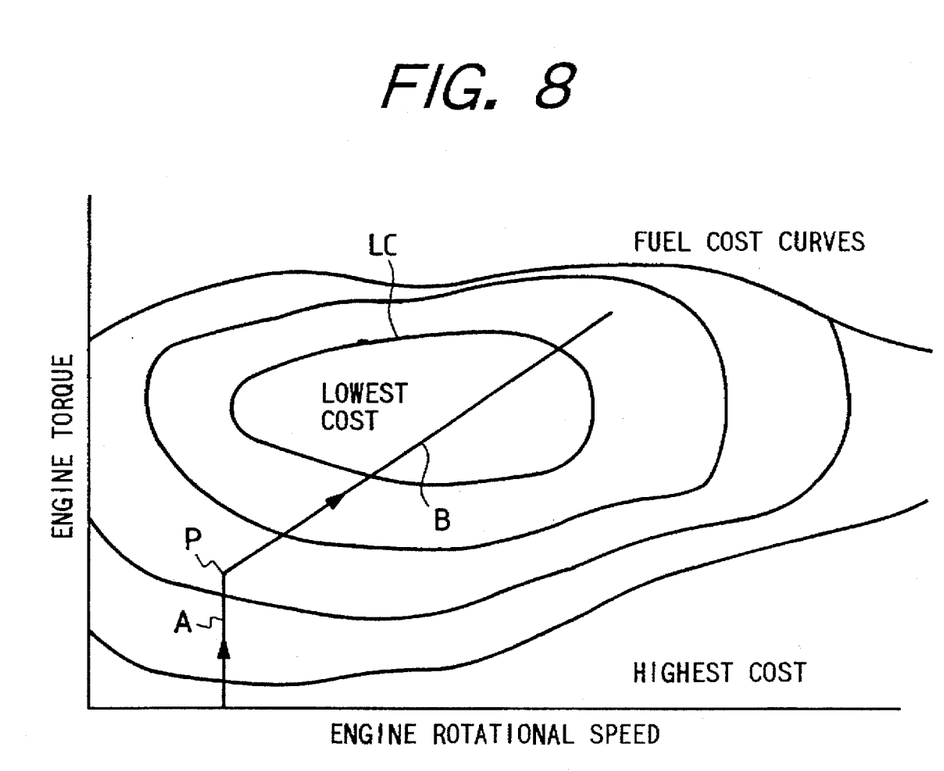
FIG. 8 is a graph showing an example of a fuel cost curve.

In a still further embodiment, for calculating a drive shaft torque shown at the section 34 in FIG. 2, fuel cost curves shown in FIG. 8 are stored in memory in the non-stage change-gear control apparatus 15. The several curves in FIG. 8 indicate varying levels of the fuel cost rate or mileage rate whereas the line represented as A and B with a fold point P is the calculated drive shaft torque of the non-stage change-gear system of the V-belt type as shown in FIG. 1. The arrows on line A-B indicate the direction of increasing vehicle speed. Speed change control can be performed where, for example, the fuel cost or fuel economy is most important by calculating the drive shaft torque using the curves of FIG. 8. An area enclosed by a center curve LC forming a closed loop represents the lowest cost or most efficient area. Ideally, the drive shaft torque curve A-B crosses at right angles with the fuel cost curves, so that the drive shaft torque can reach the lowest cost area as quickly as possible. For example, the line A shows a situation of changing gear ratio where vehicle speed is changing from a low value to a high value. Upon acceleration of the vehicle the pully ratio changes from a low gear ratio to a high gear ratio. The highest gear ratio is indicated at the fold point P, beyond which the gear ratio cannot increase. The engine rotational speed does not change along the line A so that the drive shaft torque can more quickly approach the more efficient fuel cost rate. On the line B the gear ratio is fixed and both the engine rotational speed and the engine torque increase as vehicle speed is increased in the liration of the arrow. A point on the line B in the lowest cost area surrounded by the center or innermost loop LC is utilized as the calculated drive shaft torque for maximum economy.

As a yet further embodiment, it is possible to provide the section 34 in FIG. 2 as a function indicating a drive shaft torque without using the two kinds of maps described above and normally perform calculation based on a condition of the vehicle to obtain a targeted drive shaft torque. The data of the input signal from the throttle sensor 21 in FIG. 2 may be any other signal that represents a load condition of the engine. For example, intake air amount data of the engine or fuel injection time data which is a parameter determining the fuel injection force can be used.

According to the present invention, it is possible to effect speed change conforming to a condition of the vehicle without using the speed change schedule map for the change-gear. Thus, the time required for development or tuning of speed change schedule maps is reduced remarkably.

What is claimed is:

1. A CVT control system for a vehicle, comprising:

(a) a memory for storing a fuel cost characteristic of an engine of the vehicle and a torque convertor characteristic of a torque convertor operatively connected between an engine of the vehicle and a CVT;

(b) sensors for detecting a vehicle speed, a throttle valve opening degree, an engine rotation speed, and an input shaft rotation speed of the CVT;

(c) calculating device for calculating a targeted drive shaft torque of a drive shaft of the CVT based on said detected vehicle speed and throttle valve opening degree and on stored fuel cost characteristic, for calculating an engine torque based on said detected throttle valve opening degree and engine rotation speed, for calculating an input shaft torque of the CVT based on said calculated engine torque and said stored torque convertor characteristic, for calculating a targeted transmission speed ratio based on a ratio of said calculated targeted drive shaft torque and input shaft torque, for calculating a present transmission speed ratio based on said detected vehicle speed and input shaft rotation speed, and for, calculating a control transmission speed ratio based on a difference between said calculated targeted transmission speed ratio and present transmission speed ratio; and (d) a control device for controlling a transmission speed ratio such that the transmission speed ratio becomes said calculated control transmission speed ratio.

2. A CVT control system according to claim 1, said torque convertor characteristic stored in said memory is a torque ratio.

* * * * *